United States Patent Office 3,513,133
Patented May 19, 1970

3,513,133
REACTION PRODUCT OF ELEMENTAL SULFUR WITH SULFUR CONTAINING POLYESTERS AND METHOD OF PREPARATION
William E. Weesner, 4039 Le Fevre Drive, Dayton, Ohio 45429
No Drawing. Original application Oct. 11, 1965, Ser. No. 494,888. Divided and this application Mar. 20, 1969, Ser. No. 828,044
Int. Cl. C08g 17/06
U.S. Cl. 260—75                      7 Claims

ABSTRACT OF THE DISCLOSURE

This invention relates to the reaction of certain thiopolyesters with elemental sulfur and the products of said reaction which are useful as caulking compounds, fertilizer coatings, compositions for striping or marking highways, etc.

---

This application is a division of copending application Ser. No. 494,888 filed Oct. 11, 1965 and now U.S. Patent 3,459,789.

The present invention relates to certain thiopolyesters and polymers thereof. More particularly, the invention is concerned with thiopolyesters prepared from a glycol and a monothio- or dithio-dicarboxylic acid, and the polymeric products obtained by heating one or more of these polyesters with elemental sulphur.

The polyesters of the invention are characterized by a repeating unit selected from the group consisting of

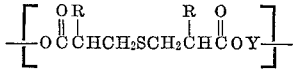

and

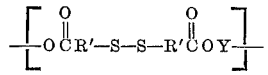

depending on whether a monothiodicarboxylic acid or a dithiodicarboxylic acid, respectively, is used wherein R is selected from the group consisting of hydrogen or hydrocarbon, notably alkyl of from 1 to 8 carbon atoms and monocyclic or dicyclic aryl of from 6 to 10 carbon atoms; R' is a hydrocarbon radical, e.g. alkyl of from 1 to 12 carbon atoms or monocyclic or dicyclic aryl of from 6 to 10 carbon atoms; and Y is selected from the group consisting of hydrocarbon and hydrocarbon-X-hydrocarbon where the hydrocarbon is, for example, alkyl containing from 2 to 12 carbon atoms, aryl containing 6 to 10 carbon atoms, alkaryl containing 8 to 15 carbon atoms or aryalkyl containing from 7–15 carbon atoms; and X stands for a member of the group consisting of oxygen and sulfur.

The novel polyesters of the invention referred to above are useful as non-volatile plasticisers for such polymers as polyvinyl chloride, rubber modifiers and the like. They are also useful for modifying or plasticizing elemental sulfur which, according to one embodiment of the invention, may be reacted therewith by heating a mixture of the sulfur and polyester to produce such useful products as caulking compounds, compositions for striping or marking highways or other surfaces as described in U.S. patent application Ser. No. 248,885, filed Jan. 2 1963 and now U.S. Pat. 3,316,115, fertilizer coatings, rubber additives, biological toxicants or potting compounds. The sulfur and polyester products contemplated herein are further characterized by good color and moderate odor which represent distinct and useful properties when contrasted with other types of sulfur-containing compounds.

The thiopolyesters of the invention may be prepared by reacting, under esterification conditions, a thiodicarboxylic acid selected from the group consisting of monothiodicarboxylic acids of the formula:

and dithiodicarboxylic acids of the formula:

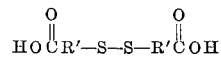

wherein R and R' have the meaning given above, with a glycol having the formula:

wherein Y also has the meaning given above. As indicated above, the resulting product may be further reacted with elemental sulfur to produce a novel sulfur-containing thiopolyester product.

Representative monothiodicarboxylic acids suitable for use herein include monothiodipropanoic acid, $$HOOCCH_2CH_2SCH_2CH_2COOH$$

and monothiodiisobutyric acid, $$HOOCCH(CH_3)CH_2SCH_2CH(CH_3)COOH$$

The esterification products obtained with these acids give clear, homogeneous melts when heated with elemental sulfur whereas the corresponding products using monothiodiacetic acid or monothiodibutyric acid do not give such desirable melts. The latter are not, therefore, included within the scope of the present invention. However, other monothiodicarboxylic acids which may be effectively used herein include any such acids wherein R is an alkyl, branched or straight chain, of up to 8 carbon atoms, e.g. ethyl, propyl, butyl, pentyl, hexyl, heptyl and octyl; or aryl such as phenyl, methylphenyl, ethylphenyl, etc.

As suitable dithiodicarboxylic acids there may be mentioned: dithiodiacetic acid $HOOCCH_2SSCH_2COOH$; dithiodipropionic acid, $HOOCCH_2CH_2SSCH_2CH_2COOH$; dithiodiheptanoic acid; dithiodioctanoic acid; and dithodibenzoic acid

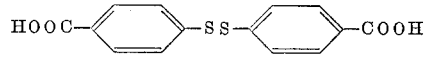

The glycols used in the present invention may be saturated or unsaturated and, if desired, mixtures of such glycols may be used with one or more of the indicated acids. Typical saturated glycols which are suitable for use include ethylene glycol, diethylene glycol, propylene glycol, 1,6-hexanediol, 1,4-butanediol, thiodiethanol, 1,12-dodecanediol. Among the unsaturated glycols which may be employed are 2-butene-1,4-diol, pentenediol and xylylene glycol. Unsaturated hydroxy ethers such as 4,4'-dihydroxydiphenyl ether, naphthalenediol, 4,4'-isopropylidene diphenol, etc. may also be used in a somewhat different procedure involvng reaction of the appropriate diacid chloride and the hydroxy compound.

The thiopolyesters of the invention may be advantageously prepared by reacting the thiodicarboxylic acid with excess glycol, desirably at atmospheric pressure in an atmosphere of nitrogen or other inert gas. The reaction may be conveniently carried out at a temperature in the range of about 140–210° C. over a period of 3–8 hours although temperatures and times outside these ranges may also be used. For the monothio products a temperature of about 170–190° C. is usually preferred while a somewhat lower temperature is used for the dithio products (e.g. 150–180° C.) because of a greater tendency to crosslink during the polymerization.

Esterification catalysts such as lead oxide or any of the commonly known basic catalysts such as amines like pyridine, triethyl amine, quinoline, etc., or alkali or alkaline earth metals or their alkoxides, oxides, hydrides, halides, etc., including sodium, potassium, sodium methoxide or sodium ethoxide, sodium hydride, lithium hydride, or calcium hydride and zinc borate or zinc chloride may be added to the reaction mixture. Acidic catalysts like p-toluenesulfonic acid, benzenesulfonic acid, etc. may also be used but tend to promote greater crosslinking than do baic catalysts.

Polymerization inhibitors, usually of the order of 0.001 to 1% of the composition may be added to reduce crosslinking. Among the inhibitors which may advantageously be employed to reduce crosslinking of the mixture are substances such as tertiary butyl catechol, ditertiary butyl cresol, hydroquinone, benzoquinone, paraphenylene diamine, trinitrobenzene, etc.

After the esterification has been completed to give the desired bis(hydroxyalkyl) dicarboxylate ester and water of esterification has been removed by distillation, it is usually preferred to reduce the pressure to, for example, 0.03–0.3 mm., with 0.50–0.2 mm. preferred, to remove the excess glycol and the reaction is then continued at the reduced pressure under nitrogen or the equivalent to build up polymer chains by splitting out glycol which is removed by distillation as it is formed. Temperatures above 200° C. during polymer formation appear to increase the amount of crosslinking in the ultimate product.

The number average molecular weights of the polyesters obtained in the manner indicated above may vary widely, e.g. in the range of 2,000 to 10,000. Stated another way, the molecular weight will usually be such that the polymer has a specific viscosity of about 0.2 to 0.4 in 1% concentration in ethylene dichloride. If desired, chain stoppers or the equivalent for controlling the polymerization to give the desired viscosity may be used. Monofunctional mercaptans, e.g. dodecyl mercaptan, may be mentioned for this purpose. Controlling the amount of cross-linking which occurs may also have significant effects in determining the tensile strength of the final polymer and for the product obtained in subsequent reaction with elemental sulfur. Other properties of the polymer, e.g. the adhesion or flexibility characteristics thereof, may be varied depending on the ratios of linear and cross-linked polymer in the final product. Special crosslinking agents, such as polyfunctional compounds or mercaptans as mentioned, may be used to vary the content of cross-linked to linear polymer and thus modify the properties of the product as desired.

As stated above, the novel thiopolyesters, produced according to the procedures thus outlined, may in yet another embodiment of this invention, be reacted with elemental sulfur to produce polymeric products comprising sulfur and the indicated thiopolyesters. Generally, elemental sulfur in amounts of about 10 to 90 weight percent or even less, based on the weight of the mixture is reacted with one or more of the thiopolyesters, usually by heating at a temperature of about 150–250° C. For this purpose, any type of elemental sulfur, e.g. the commercially available "bright" sulfur may be used. The optimum reaction temperature will vary depending on other conditions, e.g. the proportions of sulfur and polyester and the nature of the polyester. Thus, for example, when a monothiopolyester is employed as one of the reactants, the reaction temperature will ordinarily be about 170–250° C., and preferably about 210–225° C. When employing a dithiopolyester in the reaction, a temperature range of about 150–250° C., for example, 180–210° C., is generally used. In the case where the reaction involves a mixture of 80% sulfur and 20% poly(ethylene thiodipropionate), the optimum temperature appears to be around 205–235° C.

The reaction time depends upon such operating conditions as the amount of elemental sulfur used, the particular thiopolyester chosen and the temperature of reaction. Usually, however, reaction times of about 5 minutes to 2 hours or longer will suffice to produce the polymeric sulfur thiopolyesters of this invention. Advantageously, the reaction is carried out until a clear melt is obtained. Ambient pressure is often employed although subatmospheric pressures or superatmospheric pressure may be used, if desired.

The nature of the reaction occurring between the elemental sulfur and the thiopolyester is not understood. On heating the mixture, a clear melt is obtained which on cooling becomes an opaque plastic material, the exact properties of which will depend on the amount of sulfur used, the nature of the polyester, the rate of cooling and other variables. However, it appears that at least a portion of the added sulfur is actually incorporated somehow into the polymer chain. Additionally, it is believed that the reversion of polymeric sulfur formed during the heating period back to crystalline sulfur is retarded by the presence of the polyester. In any case, the resulting products are highly unique and useful in the areas referred to above.

In a further modification of the invention, it has been found that zinc chloride has a unique effect when added in small amounts (below 5% by weight) to the mixture of sulfur and polyester before heating, the chloride percentage being based on the total weight of sulfur and polyester. Apparently, the zinc chloride assists in incorporating the sulfur into the polymer chain and/or it retards the formation of crystalline sulfur. The most noticeable effect of including $ZnCl_2$ is that lower reaction temperatures can be used to obtain products with similar properties. Thus, at 170–180° C. in the absence of $ZnCl_2$, sulfur and monothiopolyesters form a brittle mass with poor plastic properties. In the presence of $ZnCl_2$ at 170–180° C., the properties of the product are very similar to those obtained at 210–220° C. in the absence of $ZnCl_2$. Other Lewis acids, e.g. boron trifluoride, aluminum trichloride and the like may also be used in lieu of, or in addition to, the zinc chloride.

The addition of polymercaptans such as trimethylolpropane tris(3-mercaptopropionate),

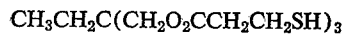

or pentaerythritol tetrakis (3 - mercaptopropionate), $C(CH_2O_2CCH_2CH_2SH)_3$, to sulfur/polyester mixtures, e.g. a sulfur/poly(ethylene thiodipropionate) mixture at temperatures around 200° C. causes a marked increase in viscosity at that temperature possibly due to crosslinking. On cooling, the products obtained have extremely light colors suitable for marking or striping purposes and they are flexible, plastic materials. An especially unique product is obtainable when the mercaptan is trimethylolpropane tris-(3-mercaptopropionate). More particularly, this mercaptan when added to the mixture of sulfur and polyester, e.g. poly(ethylene thiodipropionate) gives a product having a color approaching ivory. This result seems to be obtained only with trimethylolpropane tris-(3-mercaptopropionate). Other polymercaptans like pentaerythritol tetrakis (3-mercaptoprionate) or trimethylolpropane tris (thioglycolate) did not give as white a color although they are advantageously used. It also appears that the best products from the standpoint of color are obtained if the sulfur, polyester and polymercaptan are combined at room temperautre and placed in a heated bath at about 200° C. Heating the sulfur and polyester until a clear melt formed and then adding the polymercaptan gives a somewhat less desirable color. Sulphur concentrations of 45–85% by weight give a highly desirable color with concentrations in the range of 5–13% polymercaptan.

The invention is illustrated, but not limited, by the following examples wherein parts and percentages are on a weight basis.

EXAMPLE I

This example shows the preparation of poly(ethylene thiodipropionate) by the following reaction:

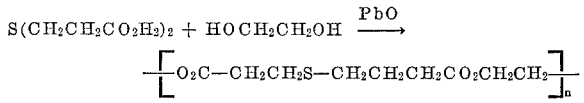

$$S(CH_2CH_2CO_2H_3)_2 + HOCH_2CH_2OH \longrightarrow$$

$$\left[ O_2C-CH_2CH_2S-CH_2CH_2CH_2CO_2CH_2CH_2 \right]_n$$

A 1-liter glass reactor was charged with 356 g. (2.0 moles) of thiodipropionic acid, 254 g. (4.1 moles) of ethylene glycol, 2.0 g. of diter.butyl cresol and 2.0 g of PbO. This was heated, under nitrogen, at 140°–160° C. for 21 hours while water of esterification was distilled out. The receiver was changed and the pressure gradually reduced (2 hours), to 0.35 mm. as excess glycol was removed. Heating was continued under nitrogen at 170–179° C. and 0.3–0.6 mm. pressure for 120 hours while ethylene glycol, formed by transesterification as the polymer chains grow, was distilled out. During the reaction period, 69.8 g. of water was obtained and 152.8 g. of ethylene glycol was recovered.

The cooled product contained blue, finely divided suspended material. The crude material was dissolved in about 1000 ml. of ethylene dichloride and filtered under vacuum through filter paper coated with Attapulgus earth. The filtrate was then treated with charcoal and again filtered. The clear, pale yellow filtrate was then heated under vacuum to remove solvent. The weight of polyester obtained prior to filtration was 395 g. (97% yield) and after filtration 340 g. of slightly cloudy, pale yellow, viscous poly(ethylene thiodipropionate) was obtained.

EXAMPLE II 20 parts of the product of Example I, i.e. poly(ethylene thiodipropionate) was mixed with 80 parts of elemental sulfur and the mixture heated at 220° C. until a clear melt was obtained (about 12–15 minutes). The melt was then allowed to cool to room temperature (25° C.) to give an opaque plastic useful as a highway center line or like marking stripe.

EXAMPLE III

A small amount (1 part) of anhydrous zinc chloride was added to a mixture of 79.2 parts elemental sulfur and 19.8 parts of the polyester of Example I, i.e. poly(ethylene thiodipropionate) and the mixture heated at 170° C. until a melt was obtained. It was found that the product gave Clash-Berg data similar to that obtained with the product of Example II at 220° C. without the use of zinc chloride. The data is tabulated below along with similar data on a coresponding product made by melting at 200° C. withotu the use of zinc chloride:

|   | ZnCl₂, 170° C. | No ZnCl₂, 220° C. | No ZnCl₂, 200° C. |
| --- | --- | --- | --- |
| Tf, ° C | −17.5 | −16.5 | +0.5 |
| T₂₀₀₀, ° C | +3.5 | +12.5 | +65 |
| Stifflex Range, degrees | 21 | 29 | 64.5 |

The above data shows that the zinc chloride either assists in incorporating the sulfur into the polymer chain or retards the formation of crystalline sulfur or both.

EXAMPLE IV 9 parts of trimethylolpropane tris 3-mercaptopropionate was added to a mixture of sulfur and poly(ethylene thiodipropionate) similar to that used in Example II and the resulting mixture heated at 200° C. until melted. The product demonstrated much greater viscosity than the product of Example II and on cooling gave an extremely light, nearly white flexible plastic especially useful for highway marking.

EXAMPLE V 47 parts of 4,4'-dithiodibutyric acid, 33 parts of ethylene glycol and 0.1 part of tert.butyl catechol were heated under nitrogen at 140–170° C. for 3 hrs. while 8.0 g. of water of esterification plus some excess glycol was distilled out. The pressure was then reduced gradually to 0.3 mm. over 1.2 hrs. and the reaction continued at 140–160° C. for 73 hrs. during which time an additional 29 g. of glycol was removed. The resulting poly(ethylene dithiodibutyrate) was dissolved in ethylene dichloride and filtered to removed small amounts of crosslinked material. The solvent-free polymer had a refractive index at 25.5° C. of 1.5421 and specific viscosity at 1% concentration in ethylene dichloride of 0.276.

EXAMPLE VI 3.5 parts of the polyester from Example V, i.e. poly(ethylene dithiodibutyrate) was heated with stirring with 6.5 parts of elemental sulfur for 5 minutes at 200° C. A clear, dark, red-brown melt formed during this period with evolution of some $H_2S$. On cooling to room temperature, a brown, opaque plastic material was obtained which had the following properties as determined by the Clash-Berg procedure:

$T_{f'}$ −36° C.
$T_{2000}$, +30° C.
Stifflex range, 66° C.
25° modulus, 3,100 p.s.i.

With 2.0 parts of the polyester from Example V and 8.0 parts of sulfur heated at 200° C. for 15 minutes, a brown opaque plastic material was obtained with the following properties as obtained by the Clash-Berg procedure:

$T_f$, −20.5° C.
$T_{2000}$, +74.5° C.
Stifflex range, 95° C.
25° modulus, 31,000 p.s.i.

EXAMPLE VII 21.4 parts of 4,4'-dithiodibenzoic acid, 29.5 parts of 1,6-hexanediol and 0.1 part of tert.butyl catechol were heated under nitrogen at 165–175° C. for 16 hrs. while 5.2 parts of water of esterification and 1.6-hexanediol were were distilled out. The pressure was then reduced gradually to 0.1 mm. and the reaction was continued at 165–170° C. for 100 hrs. During the period, 19 parts of liquid distillate was removed. The tough, brown polymer was dissolved in cyclohexanone, filtered and the solvent removed to give poly(hexamethylene 4,4'-dithiodibenzoate).

EXAMPLE VIII 20 parts of the polyester from Example VII was heated with 80 parts of elemental sulfur at 200–210° C. for 19 minutes with stirring. A clear, dark, viscous liquid resulted, which became a grey, tough, opaque plastic on cooling to room temperature. Similarly, 35 parts of the polyester from Example VII with 65 parts of elemental sulfur at 195–202° C. for 20 minutes gave a grey brittle plastic. The properties of these products as determined by the Clash-Berg procedure are as follows:

|   | 80% sulfur | 65% sulfur |
| --- | --- | --- |
| $T_f$, ° C | 31.5 | 22.5 |
| $T_{2000}$, ° C | 109.5 | 100.5 |
| Stifflex Range, ° C | 77.5 | 78 |
| 25° Modulus, p.s.i. | 200,000 | 105,000 |

EXAMPLE IX 21.4 parts of 3,3'-thiodipropionic acid, 27.6 parts of xylylene glycol and 0.1 part of tert.butyl catechol were heated under nitrogen at 165–170° C. for 3 hours. while 4.4 parts of water of esterification was removed. The pressure was gradually reduced to 0.03 mm. and reaction continued for an additional 165 hours. A total of 14.7 parts of xylylene glycol was removed by distillation during the reaction period. The crude polymer was dissolved in ethylene dichloride and filtered to remove cross linked product. The solvent-free poly(xylylene thiodipropionate) solidified on standing. Its specific viscosity at 1% concentration in ethylene dichloride was 0.373.

EXAMPLE X 5 parts of the polyester from Example IV. i.e. poly(xylylene thiodipropionate) and 5 parts of elemental sulfur were heated at 200–220° C. for 25 minutes. During this period, a clear, dark brown melt formed and on cooling to room temperature an opaque, tan, rubbery material was obtained. When 1 part of poly(xylylene thiodipropionate) was heated with 9 parts of elemental sulfur at 200–225° C. for 27 minutes, a clear red brown fluid was obtained which became a tan, opaque brittle plastic at room temperature. The properties as determined by the Clash-Berg procedure are as follows:

|  | 50% Sulfur | 90% Sulfur |
|---|---|---|
| $T_f$, ° C | −12.5 | −7.5 |
| $T_{2000}$ ° C | +4 | +35 |
| Stifflex Range, ° C | 16.5 | 42.5 |
| 25° Modulus, p.s.i | (¹) | 8,800 |

¹ Too flexible for reading.

EXAMPLE XI 23.4 parts of dimethyl thiodiisobutyrate, 26.7 parts ethylene glycol, 0.1 part tert.butyl catechol and 0.2 part PbO were heated at 165–180° C. under nitrogen for 115 hrs. while 5.7 parts of methyl alcohol was distilled out. The pressure was reduced to 0.1 mm. and reaction continued at 170–190° C. an additional 48 hrs. 28.5 parts of liquid distillate was removed during this period. The crude polymer was dissolved in ethylene dichloride, filtered and the solvent removed to give poly(ethylene thiodiisobutyrate) as a pale tan, viscous liquid with specsific viscosity of 0.167 at 1% concentration in ethylene dichloride.

*Analysis.*—Calcd. for $C_{10}H_{16}O_4S$ (percent): C, 51.72; H, 6.89; S, 13.79. Found (percent): C, 50.90; H, 6.62; S, 13.16.

EXAMPLE XII 2.0 parts of poly(ethylene thiodiisobutyrate) of Example XI and 8.0 parts of elemental sulfur were heated with stirring at 195–230° C. for 60 minutes and the resulting clear, dark red melt then cooled to room temperature. A yellow, rubbery, opaque plastic was obtained which has the following properties as determined by the Clash-Berg procedure:

$T_f$, −18.0° C.
$T_{2000}$, +16.5° C.
Stifflex range, 34.5° C.
25° modulus, 640 p.s.i.

EXAMPLE XIII

A simple ester of thiodipropionic acid was prepared and reacted with sulfur to demonstrate the necessity of using a polyester in the work.

89 parts of thiodipropionic acid was dissolved in 400 parts of absolute ethanol and 2 parts of toluenesulfonic acid was added. This solution was refluxed at 77–81° C. for 18 hrs. and then excess ethanol was removed by distillation. The crude ester was washed with aqueous $Na_2CO_3$ until neutral, then with water and finally distilled through a two-foot long Vigreux column. Diethyl thiodipropionate was obtained, B.P. 114–118°/0.6 mm., $n_D^{25.5}$ 1.4644.

The above simple ester (2 parts) was heated at 215–225° C. with 8 parts of sulfur until a clear melt formed (20 minutes). On cooling to room temperature, a soft mush was obtained. Within 24 hrs. the material appeared to be mainly a simple mixture of oily ester and crystalline sulfur with no plastic properties.

EXAMPLE XIV

Poly(ethylene adipate) was prepared from adipic acid and excess ethylene glycol in a manner similar to that described in Example I.

50 parts of this polyester was heated at 175°–220° C. for 22 minutes with 50 parts of elemental sulfur. A clear melt did not form during this reaction period. The cooled product was a crumbly solid, melting at 50° C., and devoid of the interesting plastic properties of the products obtained when a polyester containing sulfur in the polymer chain is used in the reaction with sulfur.

EXAMPLE XV

Poly(ethylene dithiodiacetate) was prepared from ethylene glycol and dithiodiacetic acid by a procedure similar to that used in Example I. 5 parts of this polyester and 5 parts of elemental sulfur were heated at 170–210° C. for 40 minutes. The clear, dark melt which resulted became an opaque tough rubber on cooling to room temperature.

EXAMPLE XVI

A mixture of 80% sulfur-20% poly(ethylene thiodipropionate) was heated at 220° C. until a clear melt was obtained. This was then poured onto a mat made of glass wool or Dacron fiber at room temperature. Tensile measurements show that 2% glass wool raised the strength to 550 p.s.i. while 0.7% glass wool gave a value of 330 p.s.i. This represents a substantial improvement in tensile strength since the strength for the unmodified reaction product of sulfur and the polyester is in the neighborhood of 50–100 p.s.i.

Finely divided calcium silicate (5% by weight) was added to a clear melt of 80% sulfur-20% poly(ethylene thiodipropionate) at 225° C. This viscous product was then poured into a mold at room temperature. Clash-Berg data showed the resulting product to be much stiffer than similar material in the absence of calcium silicate ($T_f$ −4°, $T_{2000}$ +87° vs. $T_f$ −17.5°, $T_{2000}$ +34°).

Tensile strength data on sulfur-polyester products according to the invention are tabulated below:

| Composition | Tensile properties at failure | |
|---|---|---|
|  | Strength, p.s.i. | Elongation, percent |
| 50% S, 50% Poly(ethylene thiodipropionate) | 53 | 70 |
| 65% S, 35% poly(xylene thiodipropionate) | 137 | 70 |
| 80% S, 20% poly(xylylene dithiodibutyrate) | 9 | ---- |
| 65% S, 35% poly(xylylene dithiodibutyrate) | 128 | 29 |
| 80% S, 20% poly(xylylene thiodipropionate)² | 11 | 428 |
| 80% S, 20% poly(xylylene thiodipropionate)³ | 5 | 240 |
| 80% S, 20% copolymer with glycerine | 91 | 65 |
| 65% S, 35% copolymer with glycerine | 80 | 22 |
| 80% S, 20% poly(ethylene thiopropionate) +$P_2S_5$ | 29 | 72 |
| 80% S, 20% crosslinked with glycerine | 104 | 12 |
| 80% S, 20% copolymer tetrapropenylsuccinate | 159 | 13 |
| 65% S, 20% copolymer tetrapropenylsuccinate | 58 | 34 |
| 80% S, 20% poly(ethylene thiopropionate) +2% glass wool | 552 | 1 |
| 80% S, 20% poly(ethylene thiopropionate) +0.7% glass wool | 330 | 3 |
| 80% S, 20% poly(ethylene thiopropionate) +1.3% Dacron | 190 | 9 |
| 80% S, 20% poly(ethylene thiopropionate) −1% trismercaptan | 102 | 63 |
| 80% S, 20% poly(ethylene thiopropionate) −1.5% trismercaptan | 56 | 3.6 |
| 65% S, 35% poly(hexamethylene dithiodibenzoate) | 1,238 | 17 |
| 100% poly(hexamethylene dithiodibenzoate) | 700 | 218 |

¹ Run 1 crosslinked.
² Run 2 linear.
³ Run 2 linear.

Summarizing the various results of the invention, it can be stated that the reaction of elemental sulfur with polyesters containing sulfur in the polymer chain yields products with plastic properties only if a clear, homogeneous melt is obtained at the reaction temperature. The dithio-containing (—S—S—) polyesters appear to form clear melts readily at temperatures as low as 150° C. Polyesters derived from the monothio-containing (—S—) acids (thiodipropionic acid and thiodiisobutyric acid) form clear melts with sulfur using reaction temperatures in the range of 200–220° C.

It is believed that the mechanism whereby dithio-containing polyesters react with excess sulfur to form clear melts requires an initial thermal cleavage of the S—S bond to form radicals which can add sulfur. The initial reaction of monothio-containing polyesters which have the structural unit —SCH$_2$CHRCO$_2$—, appears to be a reverse Michael reaction to form —SH groups which can also add sulfur. In both cases, a new polyester is formed containing added sulfur in the chain which is soluble in sulfur and forms a clear melt at reaction temperatures. Other reactions undoubtedly occur when sulfur is heated with polyesters containing thio and dithio groups, and it is not intended to be limited herein to any particular reaction mechanism or explanation.

The reaction of sulfur and polyesters derived from thiodipropionic acid seem to give the most outstanding results and this aspect of the invention constitutes a preferred embodiment. With this particular polyester, reaction temperatures above 190° C. and below 240° C. give the best results in terms of color and flexibility. The elemental sulfur content can be varied as indicated heretofore (e.g. 10–90%) and the flexibility as measured by Clash-Berg determinations varies inversely as the sulfur content.

The tensile strength of the polyester/sulfur products can be improved by adding thereto such fillers as glass wool and polyethylene terephthalate fiber. The use of cross-linked polyesters containing sulfur also seems to increase the tensile strength of the sulfur-polyester products.

It is possible with the present invention to obtain extremely light, ivory-colored products for use in highway marking. For example, small amounts of trimethylolpropane tris (3-mercaptopropionate) having the formula CH$_3$CH$_2$C(CH$_2$OOCCH$_2$CH$_2$SH)$_3$, or Phosgard C-22-R (Monsanto) may be added to poly(ethylene thiodipropionate) prior to reaction with the elemental sulfur to give a desirable ivory-colored product. Such sulfur-polyester reaction products are, therefore, useful for marking purposes where it may be desired to avoid the normal yellow color of elemental sulfur.

It will be appreciated that various modifications may be made in the invention described above. Hence, the scope of the invention is set out in the following claims.

What is claimed as new is:

1. A polymer comprising the product obtained by reacting a melted mixture of elemental sulphur and a thiopolyester consisting essentially of the reaction product of a glycol and a thiodicarboxylic acid, said thiopolyester being made up of a repeating unit selected from the group consisting of:

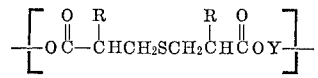

and

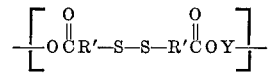

wherein R is selected from the group consisting of hydrogen and a hydrocarbon radical selected from the group consisting of alkylene of from 1 to 8 carbon atoms and monocyclic or dicyclic arylene of 6 to 10 carbon atoms selected from the group consisting of alkylene of 1 to 12 carbon atoms and monocyclic or dicyclic arylene of from 6 to 10 carbon atoms; R' is a hydrocarbon radical and Y is selected from the group consisting of hydrocarbon and hydrocarbon —X— hydrocarbon where hydrocarbon is selected from the group consisting of alkylene of from 2 to 12 carbon atoms, arylene of 6 to 10 carbon atoms, alkarylene containing 8 to 15 carbon atoms and arylalkylene containing 7 to 15 carbon atoms and where X stands for a member of the group consisting of oxygen and sulphur said thiopolyester being further characterized by a specific viscosity of 0.2 to 0.4 in 1% concentration in ethylene dichloride.

2. A polymer according to claim 1 wherein the thiopolyester is poly(ethylene thiodipropionate).

3. A polymer according to claim 1 wherein the thiopolyester is poly(ethylene thiodiisobutyrate).

4. The method of preparing the product of claim 1 which comprises heating a mixture of elemental sulphur and the thiopolyester above the melting point of the mixture and then cooling and solidifying the same.

5. The method of claim 4 wherein said mixture is heated at a temperature of 150–250° C.

6. The method of claim 4 wherein zinc chloride in an amount of below 5% by weight base on the weight of the mixture of sulfur and thiopolyester is included in the mixture.

7. The method of claim 4 wherein a polymercaptan selected from the group consisting of trimethylol-propane tris(3-mercaptopropionate) and pentaerythritol tetrakis (3-mercaptoproprionate) is included in the mixture.

References Cited

UNITED STATES PATENTS 2,813,086  11/1957  Robitschek et al. ____ 260—45.4
2,978,434  4/1961  Howald _____ 260—45.7

WILLIAM H. SHORT, Primary Examiner

L. L. LEE, Assistant Examiner

U.S. Cl. X.R.

260—40. 45.7. 470